INVENTOR.
Philip Freneau

United States Patent Office 2,954,840
Patented Oct. 4, 1960

2,954,840

CONTROLLING GASES IN SOLUTION

Philip Freneau, Santa Monica, Calif., assignor to Southwestern Engineering Company, Los Angeles, Calif., a corporation of California Filed Apr. 25, 1958, Ser. No. 730,890

9 Claims. (Cl. 183—2.5)

This invention is a method and apparatus for controlling gases in solution in condensate of a steam power plant, whereby condensate when used as feedwater for the steam generator contains controlled, small amount of dissolved gases.

The invention is particularly applicable to that type of steam power plant in which exhaust steam and contaminating gases discharge into a main condenser, from which condensate together with some small amount of contaminating gases in solution are recovered for use as feedwater, while the major portion of contaminating gases together with some entrained vapor are separately withdrawn and compressed. The vapor is condensed and the drains which discharge from the condenser, containing some small amount of contaminating gases in solution, are returned to the main condensate for use as feedwater, while non-condensables, i.e. the major portion of contaminating gases, are removed from the system.

It is an object of the invention to control the amount of dissolved gases in solution in drains, thereby controlling the amount of gases in solution in the main condensate so that the feedwater contains such small amount of dissolved gases as found advantageous for feedwater conditioning.

For example, the amines are widely used for feedwater conditioning and under boiler conditions of high temperature and pressure tend to break down and release ammonia and other gases. The major portion of ammonia, carbon dioxide and other non-condensables are removed from the system. But it is recognized that a small amount of ammonia is desirable for feedwater conditioning, and the present invention provides for returning a controlled, small amount of ammonia to the feedwater along with the drains.

The invention will be readily understood from the following description of the accompanying schematic drawings in which.

Figure 1:
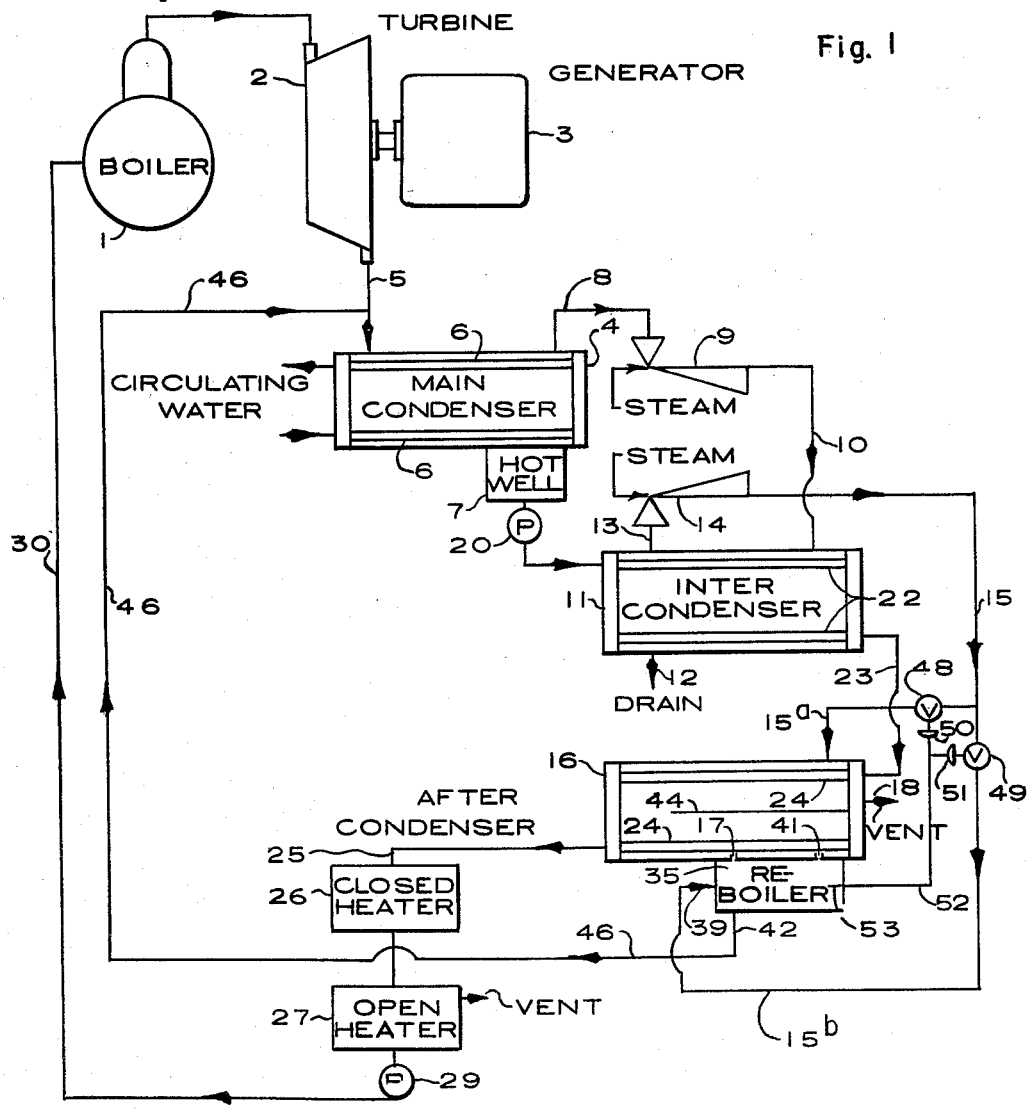
Fig. 1 is a steam power plant.
Figure 2:
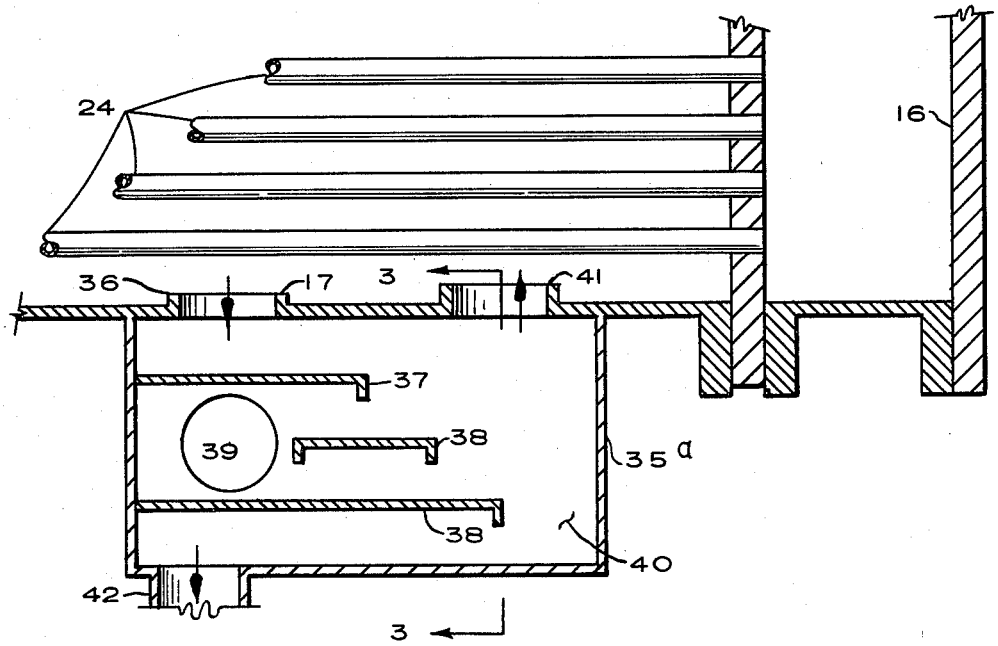
Fig. 2 is a detail section through an aftercondenser and reboiler of the steam power plant.
Figure 3:
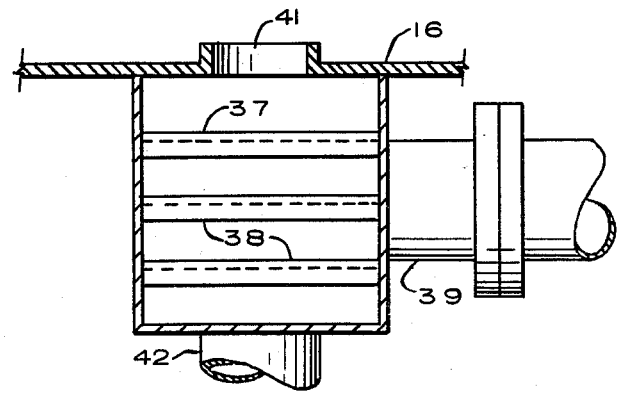
Fig. 3 is a transverse section on the line 3—3 of Fig. 2.

The invention is described in connection with the steam power plant illustrated at Fig. 1.

Steam is generated at boiler 1 and activates a turbine 2 which is shown as driving an electrical generator 3. Exhaust steam together with contaminating gases such as air, ammonia, carbon dioxide and oxygen discharge into main condenser 4 via line 5, the condenser being shown as a surface condenser cooled by water circulating via tube bundle 6.

Condensate discharges into a hot well 7, preferably at temperature close to that corresponding to absolute condenser pressure so that only small amounts of contaminating gases dissolve in the condensate. The major portion of contaminating gases, together with some entrained vapor, are removed from the main condenser via line 8 and are compressed to somewhat above atmospheric pressure, for example by a steam-jet ejector which is followed by condensation of the ejector motive steam and other condensables of the entrained load.

Two stage compression is shown, with each stage followed by a surface condenser. For example, line 8 may lead to a first stage ejector 9 which discharges via line 10 into an intercondenser 11. Drains from the intercondenser discharge at 12. Residual condensables and motive steam, together with non-condensable contaminants, are withdrawn at reduced temperature via line 13 by a second stage ejector 14 which discharges via lines 15—15a into an aftercondenser 16. Drains discharge from the aftercondenser at 17, and non-condensable contaminants are removed from the system at vent 18.

Circulating liquid for condensers 11 and 16 is preferably condensate from hot well 7, supplied via pump 20 and line 21 to the tube bundle 22 of intercondenser 11 and thence via line 23 to the tube bundle 24 of aftercondenser 16. Condensate, after discharge from tube bundle 24, is preferably reheated and employed as boiler feedwater. For example, condensate may discharge via line 25 into a closed heater 26 followed by a vented, open heater 27 from whence condensate is supplied to boiler 1 via pump 29 and line 30.

Drains discharging at 12 and 17 may be appreciably below temperature corresponding to absolute pressure in condensers 11 and 16, and in accordance with "Henry's Law" contaminating gases tend to go into solution in the drains. To reduce the amount of dissolved contaminating gases returned with drains to the main condensate and thence to the boiler feedwater, temperature of drains is increased so as to drive contaminating gases out of solution. The time required to drive off dissolved gases is a function of liquid depth, and to insure rapid degassing provision is made for discharging drains as thin films through a reboiler.

In the illustrated embodiment of the invention a reboiler is provided for drains from aftercondenser 16. A reboiler may also be provided for drains from intercondenser 11, but in the illustrated embodiment drains from the intercondenser discharge via a line (not shown) which may lead to waste or to main condenser 4.

The reboiler for after condenser 16 forms in effect spray nozzles whereby thin films of drains are heated and sprayed against the wall of the reboiler, preferably by supplying the reboiler with exhaust motive steam from second stage ejector 14. As an instance, a reboiler 35 depends upon aftercondenser 16 and has a plurality of vertically spaced horizontal trays. A weir 36 at discharge 17 supplies drains to the upper tray 37 from which drains gravitate to lower trays 38, and exhaust from ejector 14 is supplied to the reboiler via lines 15—15b and intake 39.

Drains form thin films on the trays 37—38 and ejector exhaust supplied via 39 entrains these thin films and impinges the same against end wall 35a of the reboiler. The trays terminate in spaced relation from end wall 35a to provide adequate disengaging space 40 in which contaminating gases are driven out of solution and are withdrawn, together with any residual motive steam, via stack 41. Drains, with substantially reduced amount of contaminating gases in solution, collect at the bottom of space 40 and flow along the reboiler section under the bottom tray 38 for discharge at outlet 42.

The stack 41 discharges contaminating gases and residual motive steam into aftercondenser 16, with the stack extending to a higher level than weir 36 to prevent drains entering the stack. A baffle 44 preferably provides two passes for stack discharge through the shell of the aftercondenser, the first pass concurrent with flow of cooling medium in tube bundle 24 and the second pass countercurrent. Motive steam is thus condensed and returned to the reboiler via discharge 17, and contaminating gases are withdrawn from the system via vent 18.

Drains from the reboiler 35, from which contaminating gases have been driven out of solution and removed via stack 41, are returned for use as boiler feedwater. For this purpose, drains discharging at 42 may be returned via line 46 to main condenser 4 from whence they are removed with the main condensate and supplied via line 30 to boiler 1. The amount of contaminating gases in solution in the feedwater is thus a function of the amount of contaminating gases dissolved in drains discharging from reboiler 35.

The invention controls the amount of contaminating gases in solution in the feedwater by controlling the amount of contaminating gases in solution in drains discharging from the reboiler. For this purpose, temperature in reboiler 35 is controlled, preferably by regulating the amount of ejector exhaust which, instead of being supplied to aftercondenser 16 via line 15a, is by-passed to the reboiler via line 15b. Any suitable means may control distribution of ejector exhaust to lines 15a and 15b, for example a distributing valve (not shown) having an intake connected to line 15 and outlets connected to lines 15a and 15b or, as illustrated, a valve 48 may be provided in line 15a and a valve 49 in line 15b.

By adjusting the valvular control, ejector exhaust supplied via line 15 may be distributed to lines 15a and 15b in any desired ratio, thereby controlling the temperature in reboiler 35 so as to control the amount of contaminating gases in solution in drains discharging from the reboiler. Distribution to lines 15a and 15b may range from a ratio whereby all or substantially all ejector exhaust is supplied to aftercondenser 16 via line 15a so that reboiler 35 is virtually non-functioning and drains discharging therefrom contain some appreciable amount of contaminating gases in solution, to a ratio whereby all or substantially all ejector exhaust is supplied to the reboiler via line 15b so that the reboiler functions at or near maximum efficiency whereby drains discharging therefrom contain approximately minimum quantity of dissolved gases.

Adjustment for desired functioning of reboiler 35 may be manual or automatic. In the illustrated embodiment valves 48—49 are automatically regulated as indicated at 50—51, with controls 50—51 actuated via operating connection 52 in accordance with the amount of dissolved gases remaining in drains discharging from the reboiler, the operating connection responding to a suitable analyzer (not shown) which measures the amount of dissolved gases in drains discharging at 42, or responding to a thermal device 53 which responds to temperature in the reboiler.

The invention thus provides a simple and efficient method and apparatus for controlling the amount of gases in solution in drains returned for use as feedwater in a steam power plant, thereby providing controlled, small amount of dissolved gases for feedwater conditioning, with the invention particularly applicable for controlling ammonia content of feedwater which is conditioned by use of amines.

I claim:

1. In a method of controlling gases in solution, the steps of: condensing steam to separate condensate and fluid containing gases and vapors, compressing said fluid, cooling a portion of said compressed fluid to separate non-condensables and drains containing dissolved gases, and by-passing another portion of said compressed fluid so that vapors thereof heat the drains to drive off dissolved gases.

2. The method of claim 1, including automatically regulating the amount of by-passed fluid in accordance with the amount of dissolved gases remaining in the heated drains.

3. In a method of controlling gases in solution in feedwater for a steam power plant, the steps of: condensing exhaust steam of the power plant to separate condensate and contaminating gases, withdrawing the gases by steam ejection, cooling a portion of the ejection exhaust to separate non-condensables and drains containing dissolved gases, by-passing another portion of the ejection exhaust so that motive steam thereof heats the drains to drive off dissolved gases, automatically regulating the amount of by-passed ejection exhaust in accordance with the amount of dissolved gases remaining in the heated drains, and utilizing the heated drains for said feedwater.

4. The method of claim 3, in which the heated drains are returned to the exhaust steam condensate and said condensate is utilized for said feedwater.

5. In apparatus for controlling gases in solution, a steam condenser having separate outlets for condensate and contaminating gases, a compressor communicating with said gas outlet, a condenser communicating with said compressor and having separate outlets for non-condensables and drains containing dissolved gases, and a by-pass from the compressor for heating the drains to drive off dissolved gases.

6. Apparatus as set forth in claim 5, including means for automatically regulating the by-pass in accordance with the amount of dissolved gases remaining in the heated drains.

7. In apparatus for controlling gases in solution, a steam condenser having separate outlets for condensate and contaminating gases, a compressor communicating with said gas outlet, a condenser communicating with said compressor and having separate outlets for non-condensables and drains containing dissolved gases, means for spreading the drains in a film, and a by-pass from the compressor for entraining and spraying the film for heating the drains and driving off dissolved gases.

8. In apparatus for controlling gases in solution in feedwater for a steam power plant, a condenser for exhaust steam of the power plant having separate outlets for condensate and contaminating gases, a steam ejector communicating with the gas outlet, a condenser communicating with the ejector exhaust and having separate outlets for non-condensables and drains containing dissolved gases, a by-pass from the ejector exhaust for heating the drains to drive off dissolved gases, means for automatically regulating the by-pass in accordance with the amount of dissolved gases remaining in the heated drains, and means for supplying the heated drains for said feedwater.

9. The method of claim 1 wherein said heating is by entraining and spraying a film of the drains by the by-passed fluid.

References Cited in the file of this patent

UNITED STATES PATENTS

| Re. 14,678 | Ehrhart | July 1, 1919 |
| 1,797,405 | Elliott | Mar. 24, 1931 |
| 1,907,050 | Elliott | May 2, 1933 |